July 5, 1955      M. C. FERRE      2,712,631
ELECTRICAL WELL LOGGING
Filed April 16, 1952      3 Sheets-Sheet 1
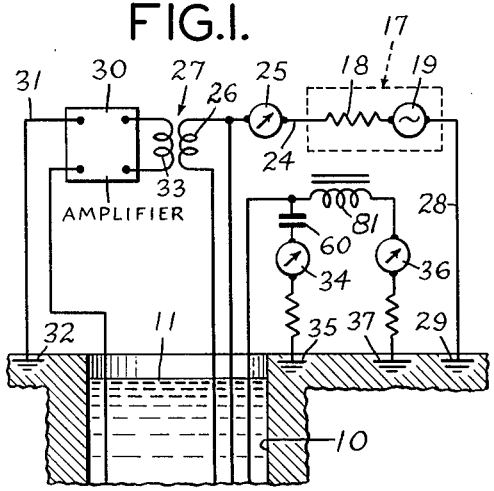
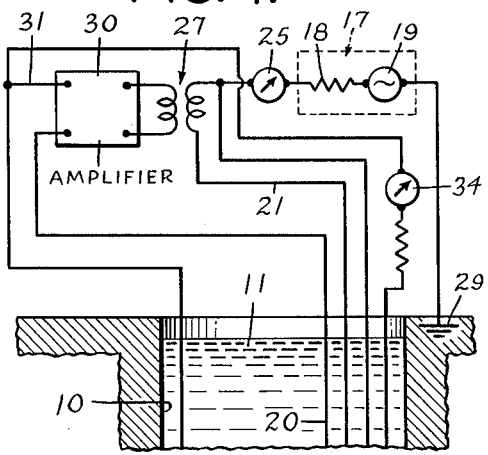
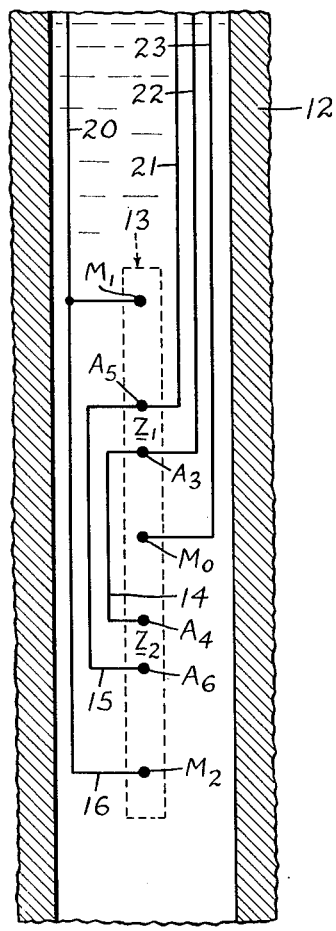
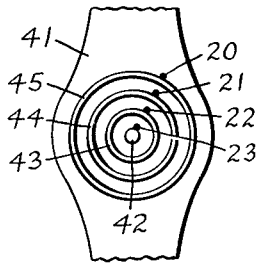
INVENTOR.
MAURICE C. FERRE
BY
Campbell, Brumbaugh, Free & Graves
HIS ATTORNEYS.

July 5, 1955 M. C. FERRE 2,712,631
ELECTRICAL WELL LOGGING
Filed April 16, 1952 3 Sheets-Sheet 2

INVENTOR.
MAURICE C. FERRE
BY Campbell, Brumbaugh, Free & Graves
HIS ATTORNEYS.

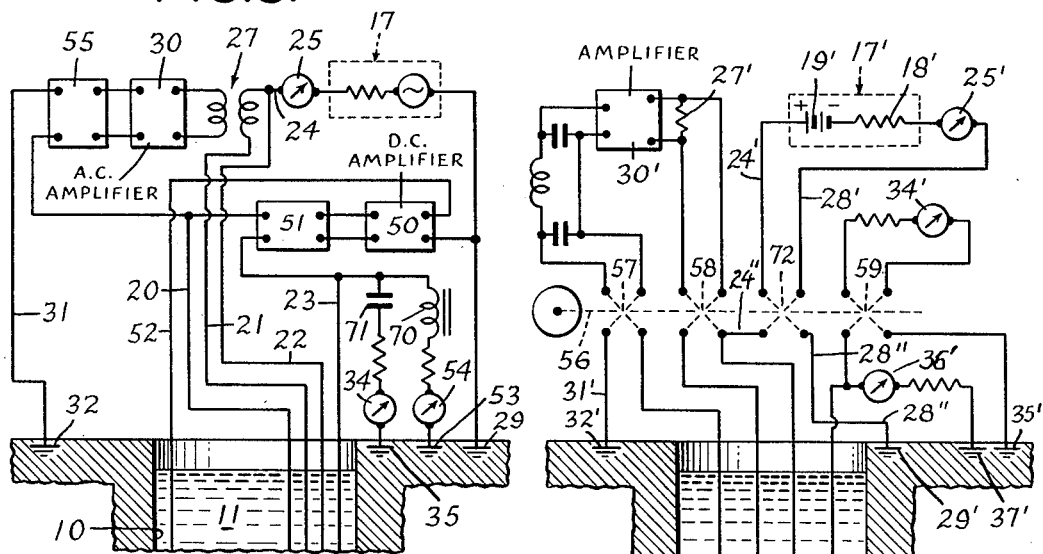

United States Patent Office 2,712,631
Patented July 5, 1955

2,712,631

ELECTRICAL WELL LOGGING

Maurice C. Ferre, Ridgefield, Conn., assignor to Schlumberger Well Surveying Corporation, Houston, Tex., a corporation of Delaware Application April 16, 1952, Serial No. 282,579

17 Claims. (Cl. 324—1)

The present invention relates to electrical well logging and more particularly to novel methods and apparatus for obtaining detailed logs of the electrical resistivity of the formations traversed by a bore hole.

The copending applications Serial No. 161,641, filed May 12, 1950, for "Electrical Resistivity Well Logging Method and Apparatus"; Serial No. 211,788, filed February 19, 1951, for "Electrical Logging Apparatus"; Serial No. 214,273, filed March 7, 1951, for "Electrical Logging of Earth Formations Traversed by a Bore Hole"; and Serial No. 257,348, filed November 20, 1951, for "Method and Apparatus for Electrical Logging of Wells," by H. G. Doll, disclose a number of different resistivity well logging methods and apparatus, each of which provides a greatly improved, detailed resistivity log in a novel manner, and each of which has proved successful in its respective field.

The present application is addressed to other different methods and apparatus for producing resistivity logs having essentially the same significance as those produced by the several electrical logging systems described in the aforementioned copending applications, which methods and apparatus may afford definite advantages in certain circumstances.

For an understanding of the invention, reference is made to the following detailed description of several typical embodiments, taken in conjunction with the accompanying drawings, in which:

Fig. 1 is a schematic diagram of an electrical logging system constructed in accordance with the invention which is adapted to produce logs having substantially the same significance as those obtained with the apparatus shown in the aforementioned copending application Serial No. 161,641;

Fig. 2 is a schematic diagram of an electrode array constructed according to the invention which is capable of producing logs of essentially the same character as are obtainable with the apparatus disclosed in the aforementioned copending application Serial No. 211,788;

Fig. 3 illustrates schematically an electrode array constructed in accordance with the invention and which provides logs essentially the same as those produced by the apparatus described in the above-mentioned copending application Serial No. 214,273;

Fig. 4 is a schematic diagram of another electrical logging system constructed in accordance with the invention, and which produces electrical logs comparable with those made by apparatus of the type shown in the aforementioned copending application Serial No. 257,348;

Fig. 5 illustrates schematically a modification of the apparatus in Fig. 1, in which means is provided for measuring static spontaneous potentials and electrical formation resistivities simultaneously; and Fig. 6 is a schematic diagram of a modified form of circuit in which the electrode arrays disclosed in Figs. 1–4, inclusive, may be employed.

Figure 1A:
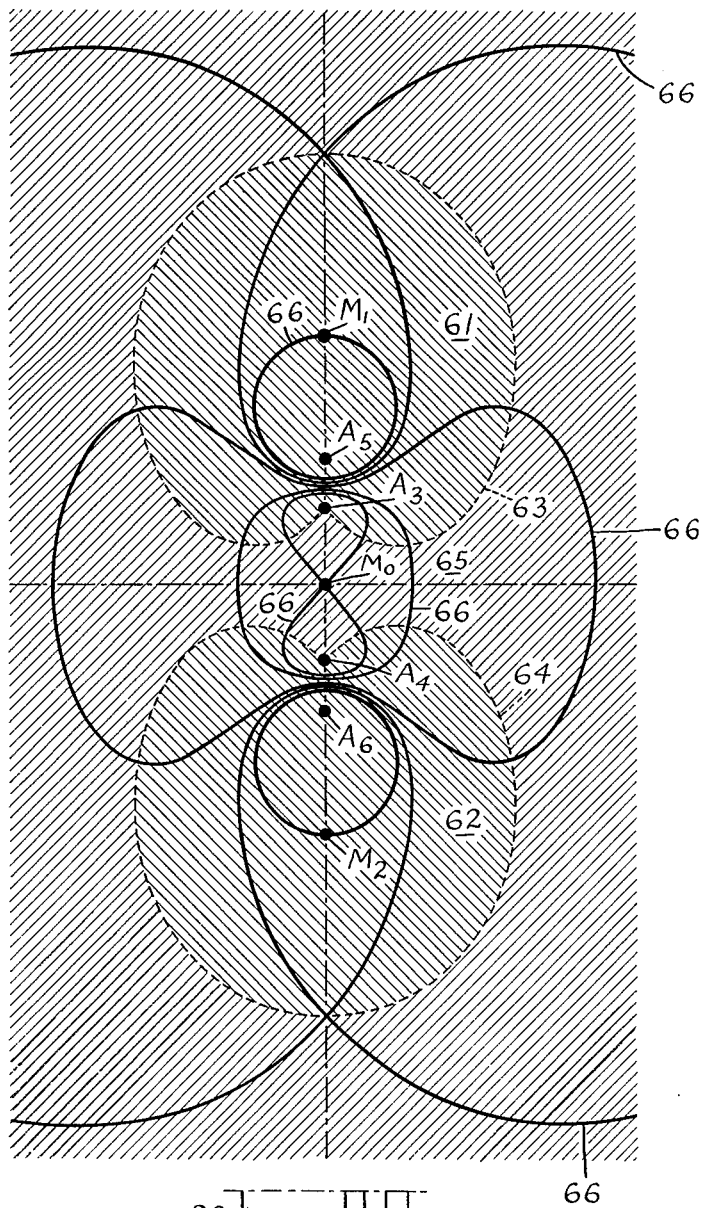
Fig. 1A is a typical diagram of the potential and current distributions produced in the earth by the electrical logging system of Fig. 1.

In Fig. 1, a bore hole 10 which contains conductive drilling fluid 11 traverses a plurality of formations 12. An electrode array 13 is adapted to be lowered through the bore hole 10 by suitable means such as an electrical cable and winch (not shown) of the type well known in the art. The array 13 may comprise, for example, seven longitudinally spaced apart electrodes, having fixed separation distances which may, for example, be determined in accordance with the principles laid down in the copending Doll application Serial No. 161,641 mentioned above. In the array are a central electrode $M_0$; a first pair of electrodes $A_3$ and $A_4$ disposed on opposite sides of the electrode $M_0$ and preferably short-circuited by an insulated conductor 14; a second pair of electrodes $A_5$ and $A_6$ disposed on opposite sides of the electrode $M_0$ at a greater distance from $M_0$ than the electrodes $A_3$ and $A_4$, and short-circuited by an insulated conductor 15; and a third pair of electrodes $M_1$ and $M_2$ mounted at opposite ends of the electrode array 13 and preferably short-circuited by an insulated conductor 16.

As the electrode array 13 is passed through the bore hole 10 opposite the formation to be logged, the electrodes $A_3$, $A_4$, $A_5$ and $A_6$ are supplied with alternating current from a source 17 which is preferably located at the surface of the earth. The source 17 is adapted preferably to supply current of constant magnitude and it may comprise, for example, an A. C. generator 19 and a high impedance 18 connected in series. The constant current from the generator 17 is applied to the electrodes $A_3$, $A_4$, $A_5$ and $A_6$ through the insulated conductors 21 and 22 in any convenient manner. For example, one output terminal of the generator 17 may be connected by a conductor 24 in series with a current indicating instrument 25 to the conductor 22, the secondary winding 26 of a transformer 27 being connected to the conductors 21 and 22, respectively, for a purpose to be described below. The other terminal of the generator 17 is connected by a conductor 28 to a ground electrode 29 at the surface. It will be understood that by this construction, substantially constant current will be emitted from a zone $Z_1$ intermediate the electrodes $A_3$ and $A_5$ and from a zone $Z_2$ intermediate the electrodes $A_4$ and $A_6$.

In accordance with the present invention, the zones $Z_1$ and $Z_2$ are electrically plugged in such a manner that the constant current from the source 17 is forced to pass, in effect, almost entirely from the inner electrodes $A_3$ and $A_4$ and thence into the surrounding formations for a considerable lateral depth (determined by the spacing) in the form of a radially extending beam. Under these conditions, measurements of the potential difference between a relatively remote reference electrode 35 and the central electrode $M_0$, which lies between the zones $Z_1$ and $Z_2$, will be more nearly indicative of the true formation resistivities. These potential measurements are preferably recorded continuously as a function of the depth of the electrode $M_0$ by means of recording galvanometer 34 connected between the reference electrode 35 and the insulated cable conductor 23, as shown. A condenser 60 or other suitable means may be provided to keep naturally occurring potentials picked up by the electrode $M_0$ out of the recording circuit.

Electrical plugging of the zones $Z_1$ and $Z_2$ in the manner described above is preferably accomplished as follows: The current flowing between the electrodes $A_3$, $A_5$ and $A_4$, $A_6$ and the ground 29 will create a potential difference between the electrodes $M_1$, $M_2$ and a ground electrode 32 at the surface. This potential difference is applied to the input terminals of a high gain amplifier circuit 30 by means of an insulated cable conductor 20 connected to electrodes $M_1$ and $M_2$ and a conductor 31 connected to the ground electrode 32. The output of the amplifier 30 is connected to the primary winding 33 of the transformer 27. Thus, there is applied across the secondary winding 26 of the transformer 27 an A. C. potential difference, the magnitude of which is a function of the potential difference between the electrodes $M_1$, $M_2$ and ground electrode 32. Accordingly, current will flow between the electrodes $A_3$ and $A_5$ and between the electrodes $A_4$ and $A_6$ in accordance with the magnitude of the potential difference between the electrodes $M_1$, and $M_2$ and ground 32.

The direction of the current flow between the electrodes $A_3$ and $A_5$ and between the electrodes $A_4$ and $A_6$ is such as to reduce the potential difference between the electrodes $M_1$, $M_2$ and ground 32. It will be understood, therefore, that the circuit comprising the electrodes $M_1$, $M_2$, the ground electrode 32, the amplifier 30, the electrodes $A_3$, $A_4$, and the electrodes $A_5$, $A_6$ comprises a degenerative feed back circuit, which maintains substantially zero potential difference between the electrodes $M_2$, $M_1$ and the ground 32.

The electrical plugging action may be better understood from the current and potential distribution diagram shown in Fig. 1A which is based on computations for the idealized case in which the electrode array 13 is assumed to be in a homogeneous medium. The potential difference between the reference electrode (assumed to be located at electrical infinity) and the electrodes $M_1$, $M_2$ is zero as a result of the controlled current flow between the electrodes $A_3$ and $A_5$ and between the electrodes $A_4$ and $A_6$. At this instant, all of the constant current from the source 17 is passing between the inner electrodes $A_3$, $A_4$ and electrical infinity.

The volumes 61 and 62 bounded by the dotted lines 63 and 64, respectively, represent the paths over which the control current passing between the electrodes $A_3$ and $A_5$, and $A_4$ and $A_6$, will flow. The volume 65 bounded by the dotted lines 63 and 64 represents the path followed by the constant current from the source 17 and emitted by the electrodes $A_3$ and $A_4$. Representative equi-potential surfaces for this current distribution are shown in Fig. 1A as solid lines 66. The current flow in the several zones is, of course, at right angles to these equi-potential surfaces. From this chart, it can be clearly seen that the material between electrodes $A_3$ and $A_5$ and between electrodes $A_4$ and $A_6$ is in effect electrically plugged with respect to the constant current flow from the electrodes $A_3$ and $A_4$, and that this constant current is forced to penetrate an appreciable lateral depth into the material 60 before spreading out. Thus, potential difference measurements made between the electrode $M_0$ and electrical infinity represent the resistivity of material to an appreciable lateral depth from electrode $M_0$.

Of course, in practice the electrode array is generally placed in drilling fluid which is more conductive than the surrounding formations. Nonetheless, the constant current flowing only for a relatively short distance through the drilling fluid and nearby material will be substantially unaffected thereby and potential measurements at the electrode $M_0$ will be more nearly representative of the true formation resistivities.

Figure 1B:
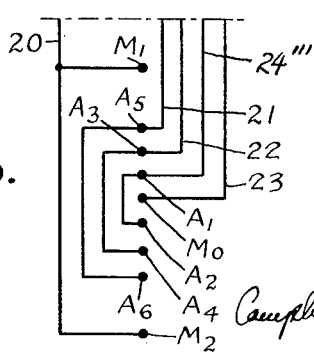
Fig. 1B illustrates schematically a modification of the electrode array shown in Fig. 1.

It will be understood that the logging current from the source 17 need not be applied to the electrodes $A_3$, $A_4$, $A_5$, $A_6$, but that two additional short-circuited current electrodes $A_1$ and $A_2$ may be connected directly through a conductor 24''' and the indicating instrument 25 to the logging current conductor 24, the indicating instrument 25 being disconnected from the conductor 22. For example, one of these electrodes $A_1$ may be placed in the zone $Z_1$ or a short distance therebelow, the other electrode $A_2$ being placed symmetrically with respect to the electrode $M_0$ in or near the zone $Z_2$, as shown in Fig. 1B.

If the separation distances between the seven electrodes shown in Fig. 1 are made substantially the same as suggested for the electrodes shown in Fig. 1 of the above-mentioned copending Doll application Serial No. 161,641, the meter 34 will give substantially the same resistivity indications as are obtained with the apparatus disclosed in the said application. However, the electrode $M_0$ in the instant application may be conveniently employed to measure the spontaneous potentials occurring along bore hole 10. To this end, a D. C. galvanometer 36 may be connected between electrode $M_0$ and ground electrode 37, a conventional choke 81 being provided to keep A. C. out of the spontaneous potential measuring circuit. The D. C. galvanometer 36 preferably makes a record of the spontaneous potentials as a function of depth in the bore hole on the same chart as the log recorded by the resistivity indicating galvanometer 34. It will be understood, therefore, that a convenient method and apparatus are disclosed for obtaining S. P. measurements, and resistivity indications which are more nearly indicative of the true formation resistivities, both measurements being made simultaneously at the same level in the bore hole.

The electrical apparatus disclosed in Fig. 1 may have other distinct advantages over the apparatus disclosed in the above-noted copending application Serial No. 161,641. For example, the relatively high electrical impedance between the electrodes $M_1$, $M_2$ and the ground 32, which is connected in the input circuit of the amplifier 30, is very convenient from an electrical standpoint. Further, the output circuit of the amplifier 30 is of lower, more constant impedance so that the power requirements of the system shown in Fig. 1 may be much lower, and in any event are more constant and thus easier to fulfill. This is highly advantageous, particularly in the case where the amplifier 30 is lowered into the bore hole along with electrode array 13.

Fig. 2 shows a modification of the invention which is adapted to provide resistivity indications of essentially the same character as those produced by the apparatus disclosed in the copending Doll application Serial No. 211,788 to which reference has been made above. In Fig. 2, the electrode assembly may comprise a large central electrode 38 disposed intermediate two short-circuited, elongated electrodes 39 and 40. The electrodes 39 and 40 may be connected to the conductors 20 and 21 and the central electrode 38 may be connected to the conductors 22 and 23 in Fig. 1. The electrical circuit for the electrodes shown in Fig. 2 may, in accordance with the invention, be substantially the same as that shown at the surface of the earth in Fig. 1 The resistivity logs produced by this system will then be substantially identical with those produced by the apparatus disclosed in the above-mentioned copending application Serial No. 211,788. However, this array is not particularly well adapted for measuring spontaneous potentials because of the short-circuiting action of the elongated electrodes 39 and 40.

The embodiment illustrated in Fig. 3 enables logs to be obtained that are comparable to those produced by the apparatus described in the copending Doll application Serial No. 214,273 mentioned above. It comprises an electrode assembly including a central electrode 42 surrounded by a plurality of concentric electrodes 43, 44 and 45, all of these electrodes being mounted in the face of a pad 41 made of flexible insulating material such as rubber. The pad 41 is adapted to be urged continuously against the wall of the bore hole by suitable means (not shown) which may be of the type shown in Doll application Serial No. 214,273, for example. The electrode array of Fig. 3 may be employed by connecting the electrodes 42, 43, 44 and 45 to the conductors 23, 22, 21 and 20, respectively. The array shown in Fig. 3 will then give substantially the same resistivity measurements as may be obtained in accordance with the principles set forth in the copending Doll application Serial No. 214,273.

The well logging system shown in Fig. 4 is adapted to provide logs having essentially the same characteristics as those produced in accordance with the disclosures in the aforementioned copending application Serial No. 257,348. It comprises an electrode array 46 including a plurality of longitudinally spaced apart electrodes $M_0$, $A_3$, $A_4$, $A_5$, $A_6$, $M_1$ and $M_2$ as in Fig. 1. However, an additional pair of electrodes $M_3$ and $M_4$, short-circuited by an insulated conductor 46', are disposed at the opposite ends of the array 46. The electrical circuit may be substantially the same as that shown in Fig. 1, except that the potential difference between the electrodes $M_1$ and $M_2$ taken together and the electrodes $M_3$ and $M_4$ taken together is fed to the input terminals of the amplifier 30 by the conductors 20 and 47. Also, the reference side of the resistivity responsive galvanometer 34 is connected to the conductor 47 so that the potential difference between the electrode $M_0$ and the electrodes $M_3$ and $M_4$ is measured. The spacing between the electrode $M_0$ and each of the electrodes $M_3$ and $M_4$ should be such that the latter electrodes cannot be considered to be at electrical infinity with respect to the electrode $M_0$. Under these conditions, the resistivity indications afforded by the galvanometer 34 will be more truly indicative of the resistivities of the invaded zones.

In Fig. 5 is shown a modification of Fig. 1 which is adapted to provide indications of static spontaneous potential measurements of the type described in the patent No. 2,592,125, granted to Henri-Georges Doll, simultaneously with indications of resistivity. The electrical resistivity indicating portion of the system may be substantially as shown in Fig. 1. However, at the opposite ends of the electrode array 13 are disposed two additional electrodes $A_7$ and $A_8$ which may be short-circuited by a conductor 49. Any D. C. potential difference between the electrodes $M_1$, $M_2$ on the one hand and the electrode $M_0$ on the other is applied to the input terminals of a conventional amplifier 50 by the conductors 20 and 23, respectively, conventional filter means 51 being provided to keep A. C. out of the amplifier 50. The output terminals of the amplifier 50 are connected to the ground 29 at the surface and by means of an insulated conductor 52 to the electrodes $A_7$ and $A_8$. As explained more fully in the aforementioned Doll Patent No. 2,592,125, the potential difference between electrode $M_0$ and the electrodes $M_1$, $M_2$ is continuously maintained substantially at zero by means of the current flowing from amplifier 50 through electrodes $A_7$, $A_8$.

The D. C. potential difference between the electrode $M_0$ and ground 53 is continually measured as a function of depth in the bore hole by suitable means such as a high impedance D. C. galvanometer 54, a suitable choke 70 being provided to keep A. C. out of the latter. As disclosed in the aforementioned Doll patent, the indications obtained by means of the D. C. galvanometer 54, which are preferably recorded simultaneously with the resistivity indications of the galvanometer 34, are representative of the static spontaneous potentials of the formations traversed by bore hole 10. Conventional filter means 55 is preferably provided in order to exclude D. C. from the input to the A. C. amplifier 30. Also, a D. C. blocking condenser 71 should be connected in series with the galvanometer 34 to keep the D. C. signals picked up from influencing the latter.

While a constant current A. C. source 17 is shown in the embodiments illustrated in Figs. 1-4, inclusive, it will be understood that a constant current D. C. source could be substituted therefor. In such case, however, means should preferably be provided for periodically reversing the connections between the D. C. source and the electrodes, as shown in Fig. 6, in order to reduce any polarization effects that may be caused by the D. C. current emission from the electrodes, and to eliminate the effects of spontaneous potentials.

Thus, a source of constant intensity D. C. 17' may be connected by the conductors 28' and 24' to the input terminals of a conventional motor driven reversing switch or commutator 72, the output terminals of which may be connected by the conductors 28" and 24" to the ground 29' and to the conductor 22, respectively. Similarly, reversing switches or commutators 57 and 58, both driven in synchronism with the commutator 72, periodically reverse the connections to the input and output terminals, respectively, of the amplifier 30'. A further commutator 59, also driven in synchronism with the commutator 72, periodically reverses the connections to the resistivity indicating instrument 34'. If desired, spontaneous potentials may also be observed by connecting a D. C. measuring instrument 36' between the conductor 23 and the ground 37', as shown.

In some cases, it may be advantageous to increase the plugging current emitted in the bore hole beyond the values required to maintain substantially zero potential differences between the points where the plugging action is desired and a relatively remote reference point, so that the potential differences are actually reversed a slight amount. This may be accomplished in any of the embodiments described above by inserting in the input circuit of the appropriate feedback amplifier a voltage equal in magnitude and opposite in polarity or phase to the reversed potential difference which it is desired to maintain.

While, in each of the forms of the invention described herein, a single feedback amplifier is used for establishing electrical plugging action at two different locations above and below a reference potential electrode, it will be understood that separate amplifiers may be employed for establishing the plugging action at the two locations, respectively. In Fig. 1, for example, this might be done by removing the conductors 14, 15 and 16, and providing a second amplifier (not shown) like the amplifier 30, having input terminals connected to the electrode $M_2$ and to a relatively remote reference point and having output terminals connected to the electrodes $A_4$ and $A_6$, the conductor to the electrode $A_4$ also being connected to the conductor 24 leading to the source of alternating current 17.

From the foregoing, it will be understood that the invention provides novel and highly effective well logging methods and apparatus which enable greatly improved, detailed logs to be obtained of the electrical resistivity of earth formations traversed by a well. By virtue of the construction shown, several desirable features obtain in the electrical circuitry and it is possible, in certain cases, to measure spontaneous potentials at a point midway between the upper and lower ends of the electrode array.

Obviously, the several representative embodiments described herein are susceptible of modification in form and detail within the spirit of the invention. Accordingly, those embodiments are to be regarded as exemplary only and not as limiting the scope of the appended claims.

I claim:

1. Apparatus for investigating the electrical resistivity of earth formations traversed by a bore hole, comprising at least two electrodes mounted for movement through the bore hole and spaced apart from one another in a direction substantially parallel to the axis of the bore hole, means for passing current between a relatively remote reference point and a location lying in the space interval defined by said two electrodes, means for emitting current of proper magnitude and polarity between two points lying in said space interval and longitudinally spaced apart with respect to said two electrodes to reduce to a substantially zero value the potential difference between the upper one of said two electrodes and a reference point longitudinally spaced apart therefrom, and means for obtaining indications of the potential difference between the lower of said two electrodes and a reference point longitudinally spaced apart therefrom.

2. Apparatus for investigating the electrical resistivity of earth formations traversed by a bore hole, comprising at least two electrodes longitudinally spaced apart with respect to the bore hole and mounted for movement through the bore hole, means for passing current between a relatively remote reference point and a location lying in the space interval defined by said two electrodes, means for emitting current of proper magnitude and polarity between two points lying in said space interval and longitudinally spaced apart with respect to said two electrodes to maintain substantially at zero the potential difference between the upper one of said two electrodes and a relatively remote reference point, and means for obtaining indications of the potential difference between the lower of said two electrodes and a relatively remote reference point.

3. Apparatus for investigating the electrical resistivity of earth formations traversed by a bore hole, comprising a central electrode mounted for movement through the bore hole and a ring-like electrode concentric with said central electrode and substantially parallel to the wall of the well, means for passing current from a first ring-like zone concentric with said central electrode through the surrounding formations to a relatively remote reference point, said zone being of lesser radius than said ring-like electrode and lying substantially parallel to the wall of the bore hole, means for passing current through the surrounding formations between two ring-like zones of different radii concentric with said central electrode, said two zones lying parallel to the wall of the bore hole and having radii of magnitude less than the radius of said ring-like electrode but the radius of at least one of said two zones being greater than the radius of said first zone, means for adjusting the current from said two zones to maintain at a substantially zero value the potential difference between said ring-like electrode and a relatively remote reference point, and means for obtaining indications of the potential difference between said central electrode and a relatively remote reference point.

4. Apparatus for investigating the electrical resistivity of earth formations traversed by a bore hole, comprising at least three electrodes mounted for movement in the bore hole and spaced equal longitudinal distances apart with respect to the bore hole, means for passing current through the surrounding formations between a relatively remote point and two locations spaced equal longitudinal distances on opposite sides, respectively, of the middle electrode of said three electrodes but inside the other two of said electrodes, means for passing between two longitudinally separated points in the vicinity of one of said locations current of proper magnitude and polarity to reduce to a substantially zero value the potential difference between one end electrode of said three electrodes and a relatively remote reference point, means for passing between two longitudinally separated points in the vicinity of the other of said locations current of proper magnitude and polarity to reduce to a substantially zero value the potential difference between the other end electrode of said three electrodes and a relatively remote reference point, and means for obtaining indications of the potential difference between said middle electrode and a relatively remote reference point.

5. Apparatus for logging wells, comprising at least three electrodes mounted for movement through the bore hole and spaced equal longitudinal distances apart with respect to the bore hole, means for passing periodically varying current through the surrounding formations between a relatively remote point and two locations spaced equal longitudinal distances on opposite sides, respectively, of the middle electrode of said three electrodes but inside the other two of said electrodes, means for passing between two longitudinally separated points in the vicinity of one of said locations periodically varying current of proper magnitude and phase to reduce substantially to zero the potential difference between one end electrode of said three electrodes and a relatively remote reference point, means for passing between two longitudinally separated points in the vicinity of the other of said locations periodically varying current of proper magnitude and phase to reduce substantially to zero the potential difference between the other end electrode of said three electrodes and a relatively remote reference point, means for obtaining indications of the periodically varying potential difference between said middle electrode and a relatively remote reference point, and means for obtaining indications of D. C. potential difference between said middle electrode and a relatively remote reference point.

6. Apparatus for investigating the electrical resistivity of earth formations traversed by a bore hole, comprising an electrode array mounted for movement through the bore hole including a pair of electrodes spaced apart longitudinally with respect to the bore hole and a third electrode located between the other two, means for emitting current through the surrounding formations between said third electrode and a relatively remote reference point, means for emitting between said third electrode and each of the other two electrodes current of proper magnitude and polarity to reduce to a substantially zero value the potential differences between a relatively remote reference point and each of said two other electrodes and means for obtaining indications of the potential difference between said third electrode and a relatively remote reference point.

7. Apparatus for investigating the electrical resistivity of earth formations traversed by a bore hole, comprising an electrode array mounted for movement through the bore hole including a reference electrode, a first pair of electrodes disposed symmetrically above and below said reference electrode and a second pair of electrodes disposed symmetrically above and below said reference electrode and outside of said first pair of electrodes, means for passing current between a relatively remote reference point and two zones located equal longitudinal distances above and below said reference electrode and in proximity thereto, means for passing between two longitudinally separated points in the vicinity of one of said zones current of proper magnitude and polarity to reduce to a substantially zero value the potential difference between the electrodes of said first and second pairs nearest thereto, means for passing between two longitudinally separated points in the vicinity of the other of said zones current of proper magnitude and polarity to reduce to a substantially zero value the potential difference between the electrodes of said first and second pairs nearest thereto, and means for obtaining indications of potential difference between said middle electrode and the electrodes of one of said first and second pairs.

8. In well logging apparatus, the combination of an electrode array including a reference electrode, a first pair of electrodes disposed symmetrically above and below said reference electrode and a second pair of electrodes disposed symmetrically above and below said reference electrode and outside of said first pair of electrodes, means for passing periodically varying current between a relatively remote reference point and two zones located equal longitudinal distances above and below said reference electrode and in proximity thereto, means for passing between a first group of two longitudinally separated points in the vicinity of one of said zones periodically varying current of proper magnitude and phase to reduce substantially to zero any periodically variable potential difference between a relatively remote reference point and the electrode in said first pair that is nearest said one zone, means for passing between a second group of two longitudinally separated points in the vicinity of the other of said zones periodically varying current of proper magnitude and polarity to reduce substantially to zero any periodically variable potential difference between a relatively remote reference point and the electrode in said first pair that is nearest said other zone, means for passing between a relatively remote reference point and the electrodes of said second pair direct current of proper magnitude and polarity to maintain substantially at zero the D. C. potential difference between said reference electrode and at least one of the electrodes in said first pair, means for obtaining indications of periodically varying potential difference between said reference electrode and a relatively remote reference point, and means for obtaining indications of D. C. potential difference between said reference electrode and a relatively remote reference point.

9. In well logging apparatus, the combination of an electrode array comprising at least two electrodes mounted for movement through the bore hole in fixed spaced apart relationship along a line substantially parallel to the axis of the well, means including a source of electrical energy for passing current between a relatively remote reference point and a location lying in the space interval defined by said two electrodes, means including a second source of electrical energy for emitting between two points lying in said space interval and longitudinally spaced apart with respect to said two electrodes current of proper magnitude and polarity to maintain substantially at zero the potential difference between the upper one of said two electrodes and a relatively remote reference point, and circuit means including electrical indicating means for providing indications of potential difference between the lower of said two electrodes and a relatively remote reference point.

10. In well logging apparatus, the combination of an electrode array mounted for movement through a well, said electrode array comprising a reference electrode and first electrode means including electrically connected electrode elements disposed symmetrically about said reference electrode along a line substantially parallel to the axis of the well, means including a source of electrical energy for passing current between a relatively remote reference point and two zones located equal distances on opposite sides of said reference electrode along said line and inside said electrode elements, second electrode means having electrode elements disposed symmetrically about said reference electrode along said line and in the vicinity of said two zones, respectively, third electrode means having electrically connected electrode elements disposed symmetrically about said reference electrode along said line outside of but relatively close to the electrode elements of said second electrode means, means including a second source of electrical energy having one terminal connected to the electrode elements of said second electrode means and a second terminal connected to the electrode elements of said third electrode means for reducing substantially to zero the potential difference between the electrode elements of said first electrode means and a relatively remote reference point, and circuit means including electrical indicating means connected to provide indications of potential difference between said reference electrode and a relatively remote reference point.

11. In well logging apparatus, the combination of an electrode array mounted for movement through a well, said electrode array comprising a reference electrode and first electrode means having electrically connected electrode elements symmetrically disposed above and below said reference electrode, means including a source of electrical energy for passing current between a relatively remote reference point and two zones located equal distances above and below said reference electrode and inside said electrode elements, second electrode means having electrically connected electrode elements disposed symmetrically above and below said reference electrode in the vicinity of said two zones, respectively, third electrode means having electrically connected electrode elements disposed symmetrically above and below said reference electrode outside of but relatively close to the electrode elements of said second electrode means, means including a second source of energy and having one terminal connected to the electrode elements of said second electrode means and having another terminal connected to the electrode elements of said third electrode means for passing through the surrounding formations current of proper magnitude and polarity to reduce substantially to zero the potential difference between the electrode elements of said first electrode means and a relatively remote reference point, and circuit means including electrical indicating means connected to provide indications of potential difference between said reference electrode and a relatively remote reference point.

12. In well logging apparatus, the combination of an electrode array mounted for movement through a well, said electrode array comprising a reference electrode and first electrode means having electrically connected electrode elements symmetrically disposed above and below said reference electrode, means including a source of electrical energy for passing current between a relatively remote reference point and two zones located equal distances above and below said reference electrode and inside said electrode elements, second electrode means having electrically connected electrode elements disposed symmetrically above and below said reference electrode in the vicinity of said two zones, respectively, third electrode means having electrically connected electrode elements disposed symmetrically above and below said reference electrode outside of but relatively close to the electrode elements of said second electrode means, electrical amplifier means having input terminals connected to the electrode elements of said first electrode means and to a relatively remote reference point and having output terminals connected to the electrode elements of said second electrode means and to the electrode elements of said third electrode means, respectively, for emitting between the adjacent electrodes of said second and third electrode means current of proper magnitude and polarity to reduce substantially to zero the potential difference between the electrode elements of said first electrode means and the remote reference point therefor, and circuit means including electrical indicating means connected to provide indications of potential difference between said reference electrode and a relatively remote reference point.

13. In well logging apparatus, the combination of an electrode array mounted for movement through a well, said array comprising a pair of relatively elongated, longitudinally spaced apart electrodes of relatively large diameter and a relatively short electrode of substantially the same diameter as said elongated electrodes disposed midway between said elongated electrodes, means connecting said elongated electrodes together, circuit means including a source of electrical energy connected to pass current between said short electrode and a relatively remote reference point, amplifier means having input terminals connected to receive the potential difference between said elongated electrodes and a relatively remote reference point and having output terminals connected to said elongated electrodes and to said short electrode, respectively, for emitting in the bore hole current of proper magnitude and polarity to reduce said potential difference substantially to zero, and circuit means including electrical indicating means connected to provide indications of potential difference between said short electrode and a relatively remote reference point.

14. In well logging apparatus, the combination of a well wall engaging member, means mounting said member for movement through a well in engagement with the wall thereof, an insulated central electrode carried by said member and having an exposed face adapted to provide electrical communication with the adjacent portion of the well wall, first, second and third insulated ring-like electrode means carried by said member and concentric with respect to said central electrode, each of said ring-like electrode means carried by said member and concentric with respect to said central electrode, each of said ring-like electrode means having an exposed face adapted to provide electrical communication with the adjacent portion of the well wall, means including a source of electrical energy for passing current through the earth formations between a relatively remote reference point and a zone concentric with said central electrode located in the vicinity of said first and second ring-like electrode means, amplifier means having input terminals connected to receive the potential difference between said third ring-like electrode means and a relatively remote reference point and having output terminals connected to said first and second ring-like electrode means for emitting therefrom current of proper magnitude and polarity to reduce said potential difference substantially to zero, and circuit means including electrical indicating means connected to provide indications of potential difference between said central electrode and a relatively remote reference point.

15. In well logging apparatus, the combination of an electrode array mounted for movement through a well, said electrode array comprising a reference electrode and first, second, third and fourth electrode means each having a pair of electrically connected electrode elements disposed symmetrically above and below said reference electrode, the spacing between the reference electrode and each of the electrode elements in a pair being greater than for the preceding pair, means including a source of electrical energy for passing current through the formations between a relatively remote reference point and two zones in the well in the vicinity of the two groups of adjacent electrode elements, respectively, of said first and second electrode means, amplifier means having input terminals connected to receive the potential difference between the electrode elements of said third and fourth electrode means and having output terminals connected to emit between adjacent electrode elements of said first and second electrode means current of proper magnitude and intensity to reduce said potential difference substantially to zero, and circuit means including electrical indicating means connected to provide indications of potential difference between said reference electrode and the electrode elements of said fourth electrode means.

16. In well logging apparatus, the combination of an electrode array mounted for movement through a bore hole, said electrode array comprising a reference electrode and first, second, third and fourth electrode means each having a pair of electrically connected electrode elements disposed symmetrically above and below said reference electrode, the spacing between the reference electrode and each of the electrode elements in a pair being greater than for the preceding pair, means including a source of electrical energy for passing periodically varying current through the formations between a relatively remote reference point and two zones in the vicinity of the two groups of adjacent electrode elements, respectively, of said first and second electrode means, first amplifier means having input terminals connected to receive the periodically variable potential difference between the electrode elements of said third electrode means and a relatively remote reference point and having output terminals connected to pass between adjacent electrode elements of said first and second electrode means periodically varying current of proper magnitude and phase to reduce said periodically varying potential difference substantially to zero, second amplifier means having input terminals connected to receive the D. C. potential difference between said reference electrode and the electrode elements of said third electrode means and having output terminals connected to pass between the electrode elements of said fourth electrode means and a relatively remote reference point D. C. of proper magnitude and polarity to reduce said D. C. potential difference substantially to zero, first circuit means including first electrical indicating means connected to provide indications of periodically varying potential difference between said reference electrode and a relatively remote reference point, and second circuit means including second electrical indicating means connected to provide indications of D. C. potential difference between said reference electrode and a relatively remote reference point.

17. In well logging apparatus, the combination of an electrode array mounted for movement through a bore hole, said electrode array comprising a reference electrode and first, second, third and fourth electrode means each having a pair of electrically connected electrode elements disposed symmetrically above and below said reference electrode, the spacing between the reference electrode and each of the electrode elements in a pair being greater than for the preceding pair, means including a source of electrical energy for passing periodically varying current through the formations between a relatively remote reference point and two zones in the vicinity of the two groups of adjacent electrode elements, respectively, of said first and second electrode means, first amplifier means having input terminals connected to receive the periodically variable potential difference between the electrode elements of said third electrode means and a relatively remote reference point and having output terminals connected to pass between adjacent electrode elements of said first and second electrode means periodically varying current of proper magnitude and phase to reduce said periodically varying potential difference substantially to zero, first circuit means including first electrical indicating means connected to provide indications of periodically varying potential difference between said reference electrode and a relatively remote reference point, and second circuit means including second electrical indicating means connected to provide indications of D. C. potential difference between said reference electrode and a relatively remote reference point.

References Cited in the file of this patent

UNITED STATES PATENTS

| | | |
|---|---|---|
| 2,347,894 | Piety | May 2, 1944 |
| 2,446,303 | Owen | Aug. 3, 1948 |
| 2,592,125 | Doll | Apr. 8, 1952 |